United States Patent
Persson (10) Patent No.: US 10,423,534 B2
(45) Date of Patent: Sep. 24, 2019

(54) CACHE MEMORY

(71) Applicant: ARM LIMITED, Cambridge (GB)

(72) Inventor: Håkan Lars-Göran Persson, Bjärred (SE)

(73) Assignee: ARM Limited, Cambridge (GB)

( * ) Notice: Subject to any disclaimer, the term of this patent is extended or adjusted under 35 U.S.C. 154(b) by 354 days.

(21) Appl. No.: 15/369,193

(22) Filed: Dec. 5, 2016

(65) Prior Publication Data

US 2017/0192900 A1 Jul. 6, 2017

(30) Foreign Application Priority Data

Jan. 5, 2016 (GB) .................................. 1600133.1

(51) Int. Cl.
| | |
|---|---|
| *G06F 12/0895* | (2016.01) |
| *G06F 12/0808* | (2016.01) |
| *G06F 12/0864* | (2016.01) |
| *G06F 12/1009* | (2016.01) |
| *G06F 12/1027* | (2016.01) |
| *G06F 12/128* | (2016.01) |
| *G06F 12/12* | (2016.01) |

(52) U.S. Cl.
CPC ...... *G06F 12/0895* (2013.01); *G06F 12/0808* (2013.01); *G06F 12/0864* (2013.01); *G06F 12/1009* (2013.01); *G06F 12/1027* (2013.01); *G06F 12/128* (2013.01); *G06F 12/12* (2013.01); *G06F 2212/6032* (2013.04); *G06F 2212/65* (2013.01)

(58) Field of Classification Search
CPC ............. G06F 12/0895; G06F 12/1027; G06F 12/1009; G06F 12/0864; G06F 12/0808; G06F 12/128
See application file for complete search history.

(56) References Cited

U.S. PATENT DOCUMENTS

| | | |
|---|---|---|
| 2012/0054443 A1 | 3/2012 | Nakra |
| 2014/0181387 A1 | 6/2014 | Poremba et al. |
| 2014/0189243 A1 | 7/2014 | Cuesta et al. |

OTHER PUBLICATIONS

Combined Search and Examination Report for GB1600133.1, dated Jun. 27, 2016, 6 pages.

*Primary Examiner* — Nathan Sadler
(74) *Attorney, Agent, or Firm* — Nixon & Vanderhye P.C.

(57) ABSTRACT

A cache memory, such as a translation lookaside buffer cache 16, includes a plurality of blocks of bit storage circuits 26 which can operate in either a first mode to store a plurality of shared-tagged data values having a shared tag, which his stored in a tag memory 24, or in a second mode to store a plurality of individual-tag data values and respective individual tags. The tag entries within the tag memory comprise the shared tag value for a given block operating in the first mode and a composite value for a given block operating in the second mode. The composite value includes a discriminator value indicative of the respective individual tags, such as a hash value or a Bloom filter value calculated in dependence upon the individual tags, using which potential matches with the individual tags may be identified from the discriminator value.

18 Claims, 7 Drawing Sheets

CACHE MEMORY

This application claims priority to GB Patent Application No. 1600133.1 filed 5 Jan. 2016, the entire contents of which is hereby incorporated by reference.

BACKGROUND

Field

This disclosure relates to the field of data processing systems. More particularly, this disclosure relates to cache memories for use within data processing systems.

Description

It is known to provide data processing systems with cache memories to provide high speed and low energy access to data and/or instructions. A cache memory stores a proper subset the data and/or instructions held within a main memory system. The particular portions of data and/or instructions from the memory address space held within the cache memory are identified by tag values. A tag value identifies a memory address region within the memory address space corresponding to one or more data values (this term also encompasses instructions) held within the cache memory. The size of the block of data values associated with a tag value within a cache memory is set by the architecture of the cache memory to represent a balance between the granularity within which blocks of data may be stored and the overhead in providing tag value storage to identify the blocks stored within the cache memory.

SUMMARY

At least some embodiments of the disclosure provide a cache memory comprising:
a plurality of blocks of bit storage circuits; and
control circuitry to control access to a given block within said plurality of blocks such that said given block operates in a selectable one of:
a first mode to store a plurality of shared-tag data values having a shared tag; and
a second mode to store a plurality of individual-tag data values and respective individual tags.

At least some embodiments of the disclosure provide a method of operating a cache memory having a plurality of blocks of bit storage circuits, said method comprising:
controlling access to a given block within said plurality of blocks such that said given block operates in a selectable one of:
a first mode to store a plurality of shared-tag data values having a shared tag; and
a second mode to store a plurality of individual-tag data values and respective individual tags.

At least some embodiments of the disclosure provide a cache memory comprising:
a plurality of blocks of bit storage circuits; and
a tag memory to store a discriminator value; wherein
a given block within said plurality of blocks stores a plurality of individual-tag data values and respective individual tags; and
said discriminator value is indicative of said respective individual tags.

The above, and other objects, features and advantages of this disclosure will be apparent from the following detailed description of illustrative embodiments which is to be read in connection with the accompanying drawings.

EMBODIMENTS

Figure 1:
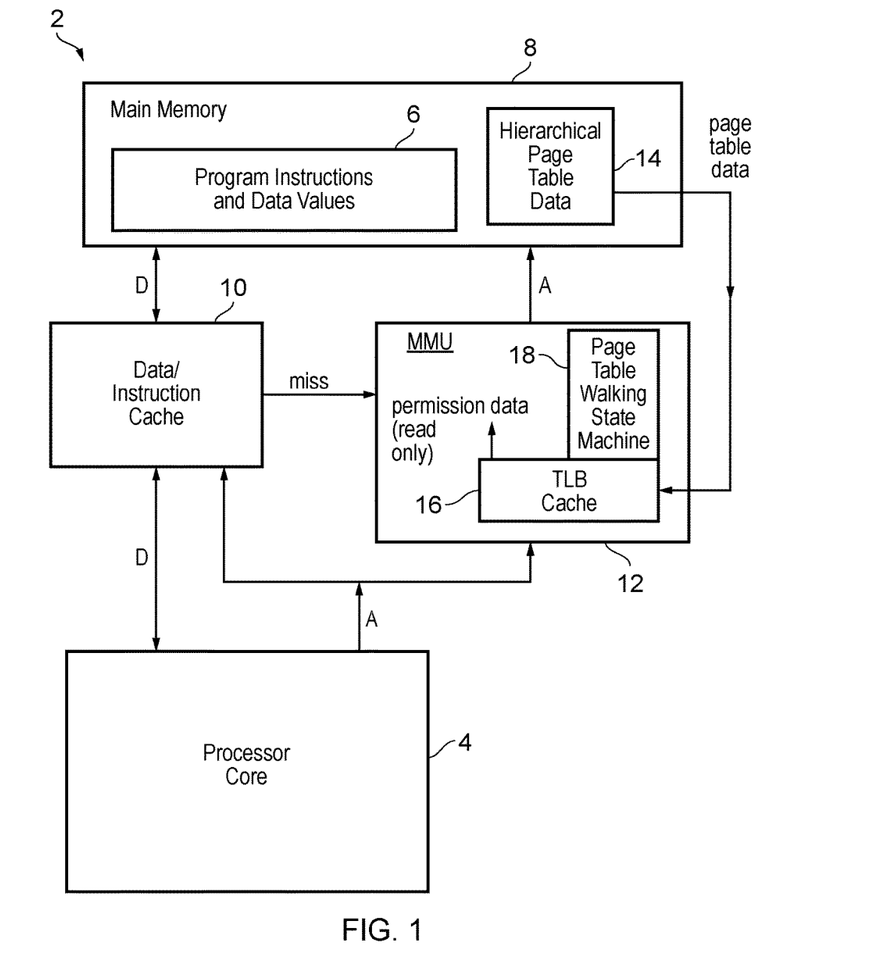
FIG. 1 schematically illustrates a data processing system including a data/instruction cache memory and a translation lookaside buffer cache memory.

FIG. 1 schematically illustrates a data processing system 2 including a processor core 4 executing program instructions to manipulate data. The program instructions and data 6 are stored within a main memory 8. A data and instruction cache 10 disposed between the main memory 8 and processor core 4 serves to cache a subset of the program instructions and data 6 locally to the processor core 4 providing higher speed and more efficient access to the cached instructions and data in accordance with conventional techniques.

A memory management unit 12 is associated with the processor core 4 and serves to manage access to the main memory 8, such as providing permission data and other characteristics (e.g. cacheability, execute never, . . . ) of regions of the memory address space corresponding to the main memory 8. More particularly, the memory management unit 12 utilizes hierarchical page table data to define, access permissions and other characteristics of regions of the memory. These regions are termed memory pages and the page data for a given page within the memory is accessed using a multi-stage page table walking operation through the hierarchical page table data 14 as will be familiar to those in this technical field. A page table walking operation is typically relatively slow to perform and accordingly the memory management unit 12 includes a translation lookaside buffer cache 16 to store page table data relating to currently active pages of data within the memory address space of the main memory 8. Accordingly, the memory management unit 12 when seeking to access the page data for a given page will initially check if that page data is present within the translation lookaside buffer cache 16. If that page data is not present within the translation page table lookaside buffer cache 16, then a page table walking state machine 18 within the memory management unit 12 performs a hierarchical page table walking operation which accesses the hierarchical page table data 14 within the main memory 8 to recover the desired page table data and store this into the translation lookaside buffer cache 16. If the translation lookaside buffer cache 16 is already full, then storing a new item of page table data will require the eviction of some existing page table data. Victim selection and replacement algorithms are techniques familiar to those in this technical field various of these techniques may be used to select which page table data is replaced.

The page table data recovered from different levels within the hierarchical page table data 14 has different characteristics associated with its use, e.g. the likelihood of imminent use of neighboring page table data. Typically, lower level page table data from within the hierarchical page table data 14 when accessed will be associated with a relatively high probability that neighboring page table data at that low level within the hierarchical page table data 14 will also be accessed relatively soon. Accordingly, when caching low level page table data within the translation lookaside buffer cache 16, it may be more efficient to cache relatively large blocks of such low level page table data incorporating multiple low level page table data entries as there is a high likelihood that those other low level page table data entries will soon be required and will thus already be present within the translation lookaside buffer cache 16. Conversely, in respect of higher level page table data entries within the hierarchical page table data 14, there is a relatively low likelihood associated when accessing a given item of such high level page table data that neighboring high level page table data will soon also be required. Accordingly, it may be more efficient to cache such high level page table data in smaller blocks such that the finite storage capacity of the translation lookaside buffer cache 16 may be utilized in storing a larger number of such small blocks of high level page table data rather than storing the high level page table data in a large number of blocks given that there is a high probability that the majority of such neighbouring blocks of high level page table data will not be required by the memory management unit 12.

Figure 2:
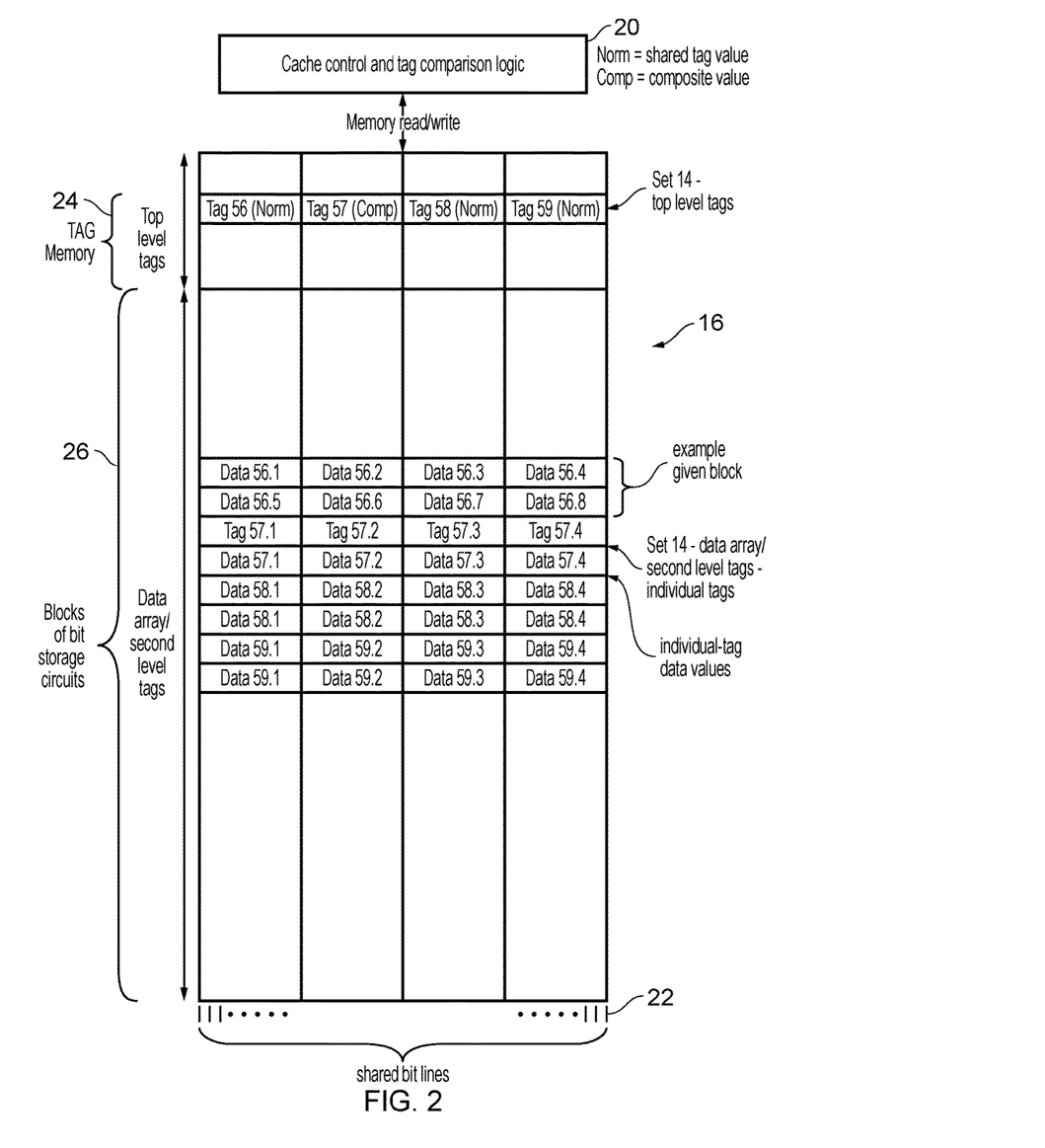
FIG. 2 schematically illustrates a cache memory including a tag memory and a plurality of blocks of bit storage circuits.

FIG. 2 schematically illustrates the translation lookaside buffer cache 16 in more detail. The translation lookaside buffer cache 16 is one example of a type of cache to which the present techniques may be applied. The present techniques may also be applied to other types of cache memory. The translation lookaside buffer cache 16 in this example embodiment comprises a unified array of bit storage cells (circuits) sharing bit lines 22 via which bit values are stored into the translation lookaside buffer cache 16 and read from the translation lookaside buffer cache 16. The translation lookaside buffer 16 is logically divided into a tag memory 24 and a plurality of blocks of bit storage circuits 26. Other example embodiments could employ physically separate and discrete memories to store respectively the tag values and the data values—in some situations this may be preferable.

The tag memory 24 stores a plurality of tag entries. The tag entries can have the form, in this example embodiment, of either a shared tag value (Norm) which is the tag value for the whole of a given block of bit storage circuits. Alternatively, a tag entry may be a composite value (Comp), which in this example embodiment comprises a discriminator value. It will be appreciated that each of the tag entries may include a flag value indicating whether that tag entry is a shared tag value or a composite value. Cache control and tag comparison circuitry 20 is coupled to the translation lookaside buffer cache 16 and serves to manage the operation of the translation lookaside buffer cache 16 as will be described further herein.

When a tag entry is a shared tag value, such as Tag 56, then this indicates that a corresponding block of bit storage circuits is operating in a first mode storing a plurality of shared-tag data values (Data 56.1, Data 56.2, Data 56.3, Data 56.4, Data 56.5, Data 56.6, Data 56.7, Data 56.8) all sharing the shared tag value Tag 56. When a lookup is made to the translation lookaside buffer cache 16 by the cache control circuitry 20, then the received address is compared against the tag entries and, in the case of a shared tag, is compared against the shared tag value to determine if there is a match. If there is a match, then a corresponding one or more of the shared-tag data values is accessed.

In the case that a tag entry is a composite value, such as Tag 57, then this indicates that a corresponding given block of bit storage circuits is operating in a second mode to store a plurality of individual-tag data values and respective individual tags. Thus, the composite value acts as a pointer to further individual tag values against which a definitive match may be made. In the example illustrated in FIG. 2, the composite value Tag 57 corresponds to a block of bit storage circuits storing four individual tags (Tag 57.1, Tag 57.2, Tag 57.3, Tag 57.4) and respective individual-tag data values (Data 57.1, Data 57.2, Data 57.3, Data 57.4). A lookup operation in the case of a block of bit storage circuits operating in the second mode is a two-stage process. A first stage is that a comparison is made with the composite value to determine if there is a potential match. If there is a potential match, then a second stage performs a comparison with each of the individual tags stored within the given block. If there is a hit on one of the individual tags within the given block corresponding to the composite value, then access to the corresponding individual-tag data value is then made.

Figure 3:
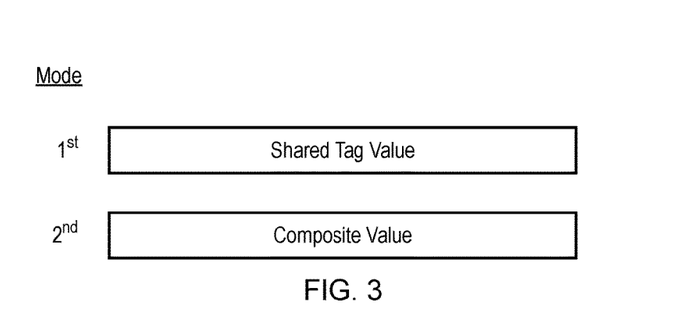
FIG. 3 schematically illustrates an entry within the tag memory corresponding to a block operating in a first mode or a second mode.

FIG. 3 schematically illustrates example tag entries stored for a given block comprising a block of bit storage circuits when operating in respective modes. When the given block is operating in a first mode, then the tag entry within the tag memory 24 for that given block is a shared tag value. When the given block is operating in the second mode, then the tag entry within the tag memory 24 for that given block is a composite value.

As previously mentioned, when the tag entry is a composite value, then a first stage comparison when a lookup is being made is used to identify potential matches with the individual tags for the given block corresponding to the composite value. In order to facilitate this determination the composite value may include a discriminator value which is indicative of the respective individual tags. The discriminator value can be formed in a variety of different ways, such as from a hash of bits within the individual tags or a Bloom filter value determined from the bits of the individual tags. Other ways of forming a discriminator value indicative of a potential match with the individual tags may also be used.

The discriminator value may be formed of a plurality of independently calculated values each of the independently calculated values being determined in dependence upon a corresponding respective individual tag. Alternatively, a single value may be calculated and used as the discriminator value for a block. In this case the single discriminator value is dependent upon a plurality of the respective individual tags, such as all of the individual tags within a given block operating in the second mode.

Another possibility would be a discriminator value with multiple portions each dependent upon a respective proper subset comprising a plurality of the individual tags for the block concerned.

Figure 4:
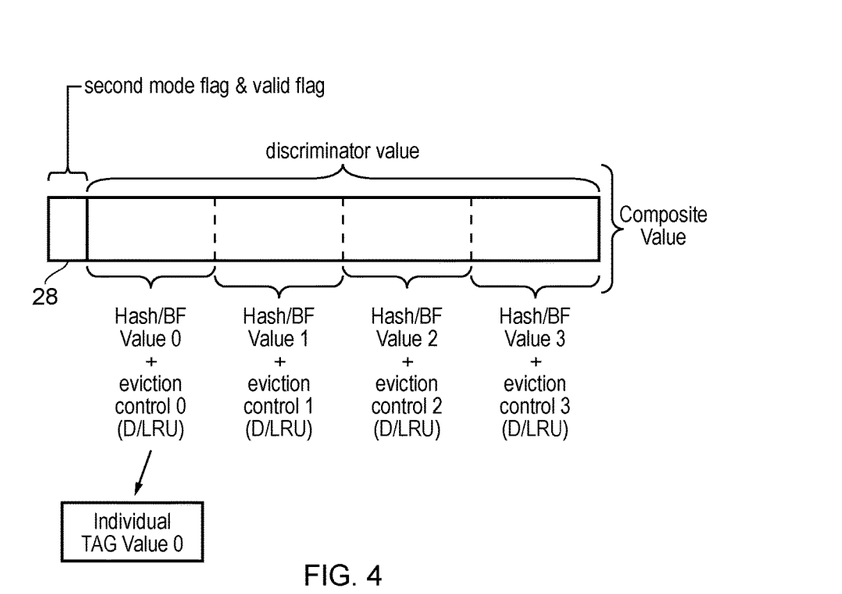
FIG. 4 schematically illustrates an example composite value entry within the tag memory.

FIG. 4 schematically illustrates one example form of a composite value. In the example illustrated in FIG. 4, the composite value includes a plurality of flags 28 including a second mode flag indicating that the tag entry concerned is a composite value rather than being a shared tag value. The flags 28 may also include, for example, a valid flag indicating that the tag entry concerned is valid. The composite value further includes a discriminator value. In this illustrated example, the discriminator value comprises a plurality of individually calculated hash or bloom filter values determined from respect individual tags within the corresponding given block. Associated with each of these individually calculated values are respective individual eviction control data entries for controlling retention within the translation lookaside buffer cache 16 of the respective individual-tag-data values and individual tags. More particularly, the eviction control data may include data such as dirty flags (indicating that an entry has been written to since it was stored within the translation lookaside buffer cache 16) and/or least recently used data indicating how recently an individual-tag data value was accessed, etc. Thus, in the example of FIG. 4 the eviction control data is stored at the level of the composite value rather than at the level of the individual tag values.

It will be appreciated that in other embodiments, the discriminator value could be calculated as a single value dependent upon all of the individual tags within the given block to which it relates. In that case, when a potential match is identified by comparing a received address with the discriminator value, then subsequently all of the corresponding individual tags may be checked against that address. Conversely, when the discriminator value comprises individually calculated values dependent upon respective individual tags, then when a match is detected with one of these individual calculated values, then only the corresponding matching individual tag needs to be checked against the address.

It will be appreciated that in some example embodiments the individual tag size may be reduced in bit size by using an encoding for the individual tag that takes into account the information represented within the discriminator value, such that bits that have already been matched against an input address by the match against the discriminator value need not be stored again within the individual tags. This frees more space within the given block for storing the individual tags and the individual-tag data values.

In the example of FIG. 2 there is an implication that data may be stored either in the form of part of shared-tag data values, or as an individual-tagged data value. This need not necessarily be the case. The cache memory to which the present technique is applied may be one in which data to be stored may all be stored as a shared-tag data value whereas other data of a type to be stored in the cache memory may all be stored as an individual-tagged data value. Conversely, in other embodiments, such constraints may not apply and an individual item of data may be stored in either form. It is also possible that a given cache memory may operate to store some data which may only be stored in one type as well as storing data which may be stored as either type.

The control circuitry 20 when it performs a comparison against the discriminator value serves to identify a potential match. The discriminator value is selected such that it does not generate false negatives for such potential match detection. The comparison with the discriminator value can produce false positives, namely when the full comparison is performed against the respective individual tags, no match is actually found. Thus the discriminator value indicates a potential match rather than indicating a certain match. If no potential match is indicated by the comparison with the discriminator value, then the control circuitry 20 can terminate a given access request. When there is a match with the discriminator value, then the access request proceeds further and the cache controller 20 serves to read and perform a comparison with the individual tags from the given block which matched at the discriminator value level.

It will be appreciated that given that the discriminator value does not represent the full individual tags, then there arises the possibility that a plurality of individual tags will alias with each other in respect of their corresponding discriminator values, i.e. different individual tags will have the same discriminator value. In order to address this issue, the control circuitry 20 may be configured to control allocation of individual-tag data values, and corresponding individual tags, into the plurality of blocks such that all individual tags within a given set of the associative translation lookaside buffer cache 16 which alias with each other (within the discriminator value) are allocated to the same given block. This may involve evicting an existing entry within that given block if necessary in order to make room for the new entry which aliases against another entry within that block. The control circuitry 20 can use the valid bits associated with individual-tag data values within the discriminator value to individually mark as valid or invalid particular entries within a given block. Thus, a given block may not be completely full of data entries at any point in time.

Figure 5:
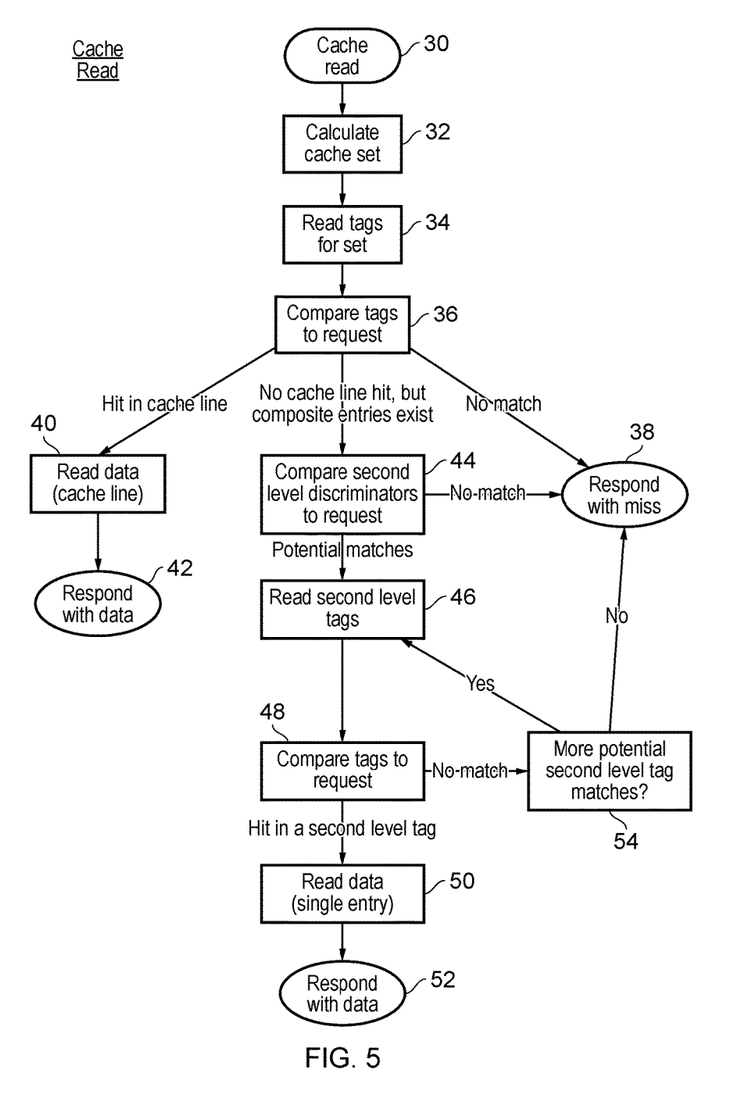
FIG. 5 is a flow diagram schematically illustrating an example of cache read operation.

FIG. 5 is a flow diagram schematically illustrating an example of cache read operation as controlled by the control circuitry 20. At step 30 a cache read operation is received (e.g. a memory access request to a given address). Step 32 determines the cache set within an associative cache with which tag comparisons are to be made. Step 34 reads the tag entries for the cache set identified at step 32. These tag entries may be shared tag values or composite values. Step 36 compares the tag entries read at step 34 with the address of the access request being made. If there is no match, then step 38 returns a cache miss response. If there is a hit with a shared tag value, then step 40 serves to read the corresponding shared-tag data value or values from the corresponding given block of bit cell circuits and then returns this data at step 42.

If the comparison at step 36 identified a tag entry that is a composite value, then step 44 serves to compare the address associated with the access request with the discriminator value of the composite value. If there is no potential match, then processing again proceeds to step 38 where a miss response is returned. If there is a potential match identified at step 44, then processing proceeds to step 46 where the individual tags are read from the given block. Step 48 then compares these individual tags with the access request. If there is a match between the access request and an individual tag read at step 48, then step 50 reads and returns the corresponding individual-tag data value and responds with that data value at step 52. If there is no match identified at step 48, then processing proceeds to step 54 where it is determined if there are more potentially matching individual tags which need to be compared. This corresponds to the situation in which the set identified at step 32 contains multiple discriminator values which potentially match with the received address indicating that multiple sets of individual tags need to be checked. If there are further such sets of individual tags which need to be checked, then the next of these is selected and processing returned to step 46. The presence of multiple matching discriminator values may be avoided when aliasing individual tags are constrained and controlled by the control circuitry 20 to be stored within the same given block. This would remove the need for step 54 in FIG. 5.

Figure 6:
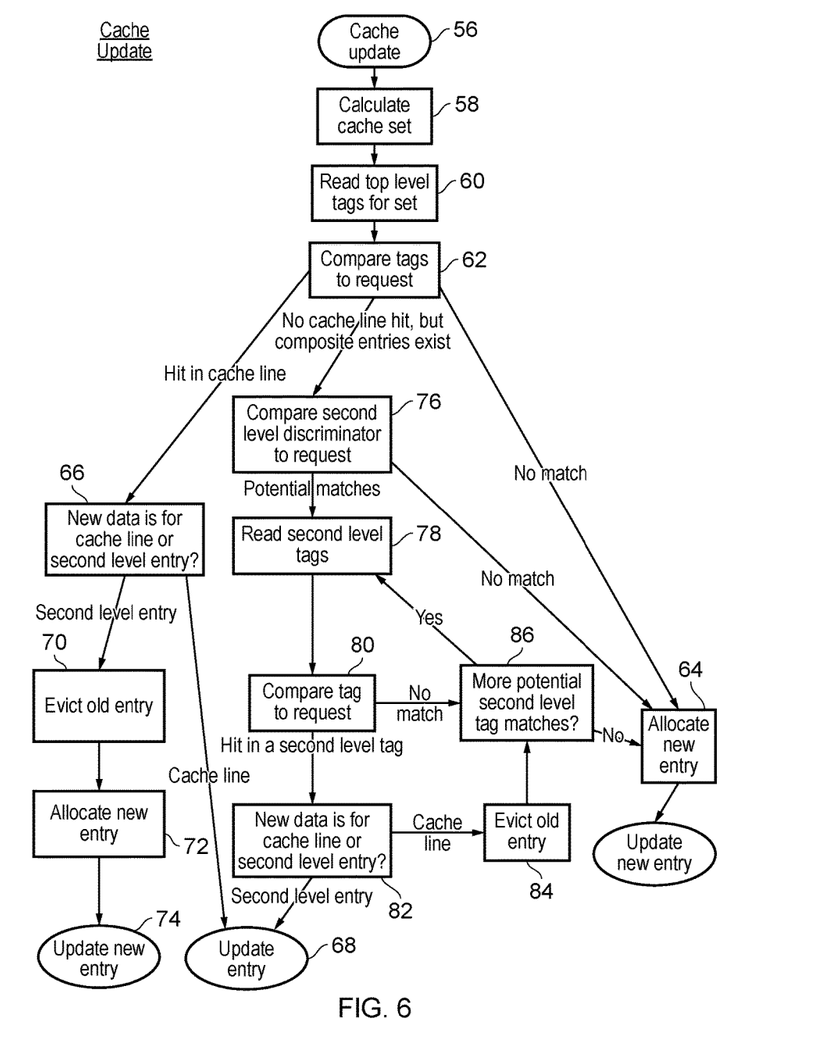
FIG. 6 is a flow diagram schematically illustrating an example of cache update operation.

FIG. 6 is a flow diagram schematically illustrating an example of the operations controlled by the control circuitry 20 when performing a cache update. At step 56 a cache update request is received. Step 58 determines the set within the associative cache memory which is to store that cache update. Step 60 reads the tag entries for that set identified at step 58. Step 62 compares the tag entries read at step 60 with the address of the cache update to be performed. If there is no match and there are no discriminator values within the read tag entries, then processing proceeds to step 64 where a given block is allocated to store the new entry (possibly including a victim selection and eviction operation).

If at step 62 there is a hit within the read tag entries, and there are no discriminator values within the tag entries read at step 60, then processing proceeds to step 66 where a determination is made as to whether or not the new data item to be stored is to be stored in the first mode as a shared tag data value or in the second mode as an individual-tag data value. If the new data value is to be stored as a shared-tag data value, then processing proceeds to step 68 where the value is stored into the storage location corresponding to the cache hit. If the determination at step 66 is that the new data item to be stored is to be stored as an individual-tag data value in the second mode, then processing proceeds to step 70 where the entire entry for the shared tag against which a match was made is evicted and then the new entry stored within that location using the second mode as an individual-tag data value with associated discriminator value is stored within the tag entry using steps 72 and 74.

If the determination at step 62 identifies that the tags read at step 60 include one or more composite values, then processing proceeds to step 76 where a comparison is made between those one or more discriminator values and the address of the cache update. If there is no match, then processing proceeds to step 64. If there is a potential match or matches, then processing proceeds to step 78 where the individual tags for the first (or only) discriminator value which matches are read. Step 80 then compares these individual tags with the update request address. If there is a hit, then processing proceeds to step 82 where there is a determination as to whether or not the new data which is being updated is a shared-tag data value or an individual-tag data value. If the new updated data value is an individual-tag data value, then processing proceeds to step 78 where that individual-tag data value is updated. If the data to be cached is a shared-tag data value, then the hit with one of the individual-tag data values requires that the entire block containing that individual-tag data value be evicted and this is performed at step 84. Processing then proceeds to step 86 where a determination is made as to whether or not there are any further discriminator values identified at step 76 which need to be checked to determine whether actual matches occur subsequent to the potential matches which were identified at step 76. If there are further discriminator values to be checked, then processing returns to step 78 where the next of these discriminator values is selected and checked. If there are no further discriminator values to be checked, then processing proceeds from step 86 to step 64 where a new entry is allocated for the shared tagged data values (i.e. an entire cache line).

Figure 7:
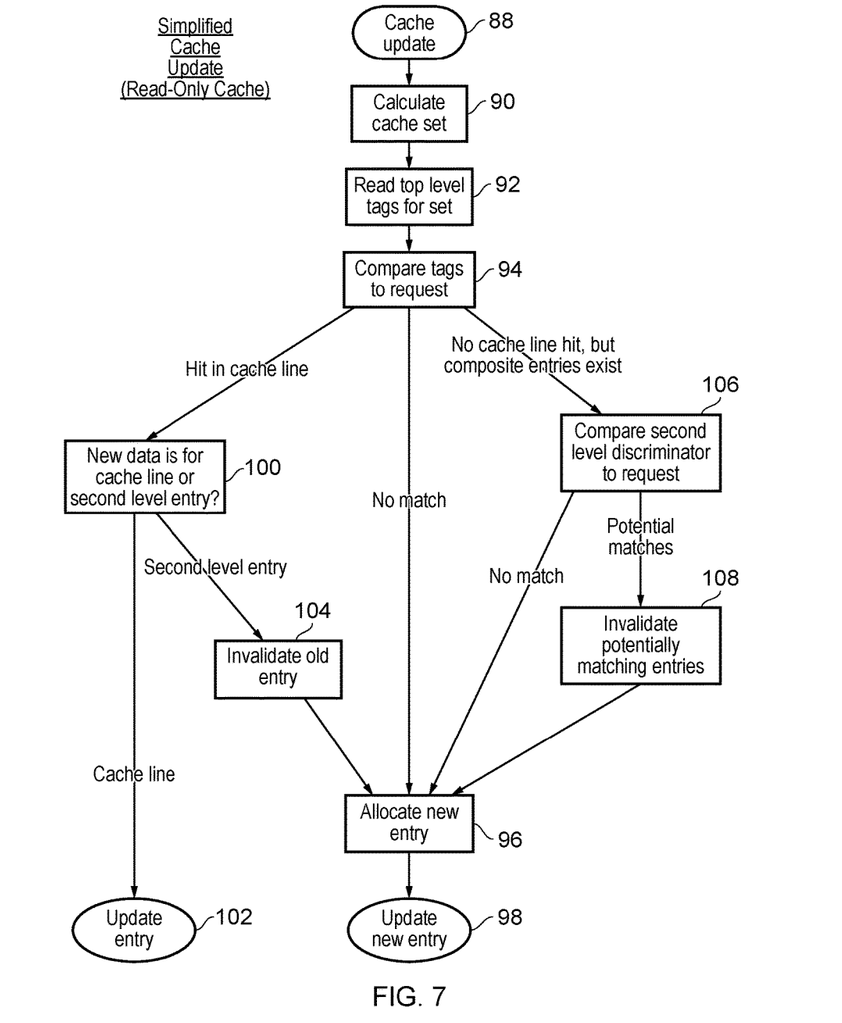
FIG. 7 is a flow diagram schematically illustrating an example of simplified cache update operation.

FIG. 7 is a flow-diagram schematically illustrating an example of the control performed by the cache control circuitry 20 performing a simplified cache update operation applicable to, for example, read-only caches. At step 88 a cache update operation is received. Step 90 determines within the associative cache which set is potentially storing data corresponding to the address for which the cache update relates. Step 92 then reads the tag entries for the set identified at step 90. Step 94 compares the tag entries read at step 92 with the address of the cache update operation. If there is no match, then processing proceeds to step 96 where a new entry is allocated within the set identified and then the update performed at step 98. If the determination at step 94 is that there is a match with a shared tag, then processing proceeds to step 100 where a determination is made as to whether or not the new data corresponding to the cache update is a plurality of shared-tag data values (e.g. a full cache line) or an individual tag-data value. If the new data value is a plurality of shared-tag data values, then the entry is updated at step 102. If the new entry is an individual-tag data value, then step 104 invalidates the corresponding plurality of shared-tag data values for which the hit arose at step 94 and processing then proceeds to step 96 where a new entry within the cache memory is allocated and the new data value written therein.

If the determination at step 94 is that the tag entries read include a discriminator value, then processing proceeds to step 106 where a comparison is made between the discriminator value and the address of the cache update. If this indicates there are potential matches, then processing proceeds to step 108 where the entries for those potentially matching individual-tag data values are invalidated (without checking the actual individual tags) before processing again proceeds to step 96 for the allocation of a new entry. If there is no potential match identified at step 106, then processing proceeds directly to step 96.

Figure 8:
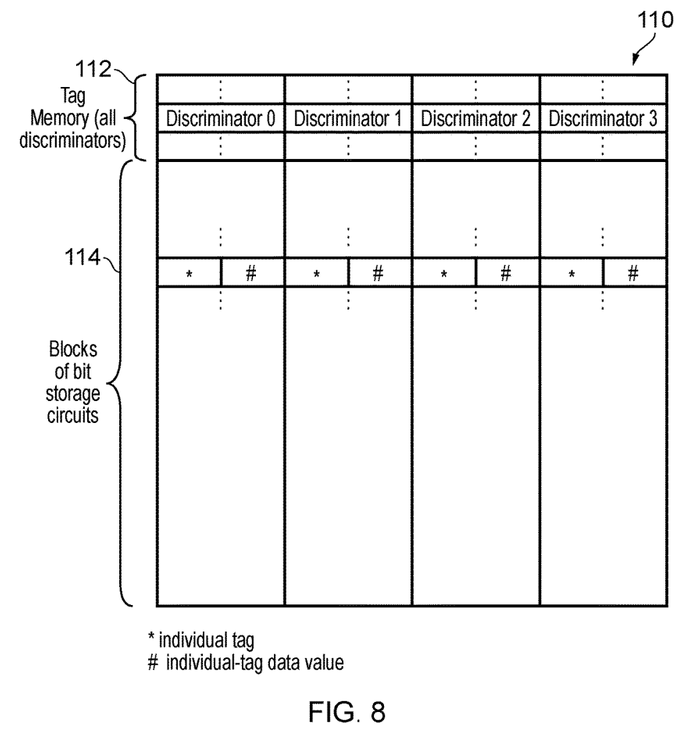
FIG. 8 schematically illustrates a cache memory including a tag memory storing discriminator values and a plurality of blocks of bit storage circuits storing individual-tag data values and respective individual tags.

FIG. 8 schematically illustrates another example embodiment of a cache memory 110 including a tag memory 112 and a plurality of blocks of bit storage circuits 114. In this example embodiment, the tag entries within the tag memory 112 all comprise discriminator values used to identify potential matches with individual tags stored within a given block of the plurality of blocks of bit storage circuits 114. If a hit occurs identifying a potential match with one of the discriminator values, then the individual tags within the identified given block may be checked to confirm a hit. In this example embodiment, the cache memory 110 does not store shared tags or shared-tag data values. The technique of using a discriminator value in conjunction with individual tags stored within a given block identified by that discriminator value permits high degrees of associativity to be supported without requiring disadvantageously wide comparators to compare a large number of tags in parallel. Instead, effectively multiple sequential lookups are performed, firstly a lookup corresponding to a discriminator value and then, if necessary, a lookup corresponding to individual tags.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

I claim:
1. A cache memory comprising:
 a plurality of blocks of bit storage circuits; and
 control circuitry to control access to a given block within said plurality of blocks such that said given block operates in a selectable one of:
  a first mode to store a plurality of shared-tag data values having a shared tag; and
  a second mode to store a plurality of individual-tag data values and respective individual tags.

2. A cache memory as claimed in claim 1, comprising a tag memory to store a plurality of tag entries, wherein a given tag entry within said plurality of tag entries corresponding to said given block stores one of:
   said shared tag value when said given block is in said first mode; and
   a composite value when said given block is in said second mode.

3. A cache memory as claimed in claim 2, wherein said composite value includes a second mode flag indicating said given block is in said second mode.

4. A cache memory as claimed in claim 2, wherein said composite value includes a discriminator value indicative of said respective individual tags.

5. A cache memory as claimed in claim 4, wherein said discriminator value is one of:
   a plurality of independently calculated values in dependence upon said respective individual tags; and
   a single value calculated in dependence upon said plurality of respective individual tags.

6. A cache memory as claimed in claim 5, wherein said cache memory is a read-only cache memory and when allocating one of said plurality of blocks to store a subject shared-tag data value having a subject shared tag, said control circuitry invalidates any stored individual-tag data values and respective individual tags having discriminator values matching a discriminator value determined from said subject shared tag and within a same cache set.

7. A cache memory as claimed in claim 4, wherein said control circuitry is responsive to an access request to said given block when said given block is in said second mode to perform a comparison of at least part of a memory address value associated with said access request with said discriminator value to identify when none of said respective individual tags match said memory address value whereupon said access request is terminated.

8. A cache memory as claimed in claim 7, wherein, when said comparison identifies at least one of said respective individual tags is a potential match with said memory address value, said control circuitry reads said respective individual tags from said given block and compares said respective individual tags with said memory address value.

9. A cache memory as claimed in claim 4, wherein said control circuitry controls allocation within said plurality of blocks of individual-tag data values and respective individual tags such that when a plurality of aliasing individual tags within a same cache set that alias with each other within said discriminator value are detected, said plurality of aliasing individual tags and corresponding individual-tag data values are stored together within a common block of said plurality of blocks.

10. A cache memory as claimed in claim 2, wherein said tag memory and said plurality of blocks of bit storage circuits comprise a block of memory having shared bit lines and control circuitry comprising comparator circuitry coupled to said shared bit lines to provide access to both said tag entries stored in said tag memory and said respective individual tags stored in said given block.

11. A cache memory as claimed in claim 2, wherein said composite value includes eviction control data for said plurality of individual-tag data values and respective individual tags, and said control circuitry is responsive to said eviction control data to control eviction operations for said plurality of individual-tag data values and respective individual tags.

12. A cache memory as claimed in claim 11, wherein said eviction control data includes respective dirty bits for said plurality of individual-tag data values indicative of whether said plurality of individual-tag data values have been changed while stored in said given block.

13. A cache memory as claimed in claim 11, wherein said eviction control data includes validity data indicative of whether said given block contains valid data and said control circuitry invalidates said plurality of individual-tag data values and respective individual tags by changing said validity data.

14. A cache memory as claimed in claim 1, wherein said cache memory is a read-only cache memory and when changing said given block from storing said plurality of individual-tag data values and respective individual tags to storing said shared-tag data values, said control circuitry invalidates all of said plurality of individual-tag data values and respective individual tags within a cache set corresponding to said given block.

15. A cache memory as claimed in claim 1, wherein said cache memory is part of a memory management unit and stores page table data from hierarchical page tables having a plurality of page table levels.

16. A cache memory as claimed in claim 15, wherein said control circuitry control said cache memory to store said page table data in either said first mode or said second mode in dependence upon to which level within said plurality of page table levels said page table data corresponds.

17. A cache memory as claimed in claim 1, wherein said share-tag data value and said individual-tag data values have different sizes and different purposes.

18. A method of operating a cache memory having a plurality of blocks of bit storage circuits, said method comprising:
   controlling access to a given block within said plurality of blocks such that said given block operates in a selectable one of:
      a first mode to store a plurality of shared-tag data values having a shared tag; and
      a second mode to store a plurality of individual-tag data values and respective individual tags.

* * * * *